Patented Oct. 6, 1925.

1,555,835

UNITED STATES PATENT OFFICE.

JAMES A. CRAIG, OF NEW ORLEANS, LOUISIANA, ASSIGNOR, BY MESNE ASSIGNMENTS, OF ONE-HALF TO ALEXANDER T. McCURDIE, OF HATTIESBURG, MISSISSIPPI.

LUMBER DRIER.

Application filed August 10, 1920. Serial No. 402,614.

*To all whom it may concern:*

Be it known that I, JAMES A. CRAIG, a citizen of the United States, residing in New Orleans, in the parish of Orleans and State of Louisiana, have invented certain new and useful Improvements in Lumber Driers, of which the following is a specification.

This invention relates to rotary air driers for drying lumber or other materials in natural air without the aid of heat or fans.

The main object of the present invention is to provide a machine of this kind in which the lumber may be revolved extremely rapidly so as to utilize centrifugal force and at the same time to compress the air to cause it to pass rapidly through the lumber stack without particularly changing the direction of the air or causing any pocketing thereof.

Another object of the invention is to provide a machine of this kind which may be driven at this very high rate of speed so as to be very effective in operation, without the danger of collapse of the machine.

Another object of the invention is to provide a machine of the above described kind which may be easily charged with lumber or other material with a minimum of time and labor, and from which the lumber may be as easily removed after drying.

Other objects of the invention will appear as the description proceeds; and while herein minute details of the invention are disclosed, the invention is not limited to these since many and various changes may be made without departing from the scope of the invention as claimed.

In the accompanying drawing showing by way of example one of many possible embodiments of the invention—

Fig. 1 is a side elevation of the drier;

Fig. 2 is a sectional view taken on the line 2—2 of Fig. 1;

Fig. 2ª is a fragmental side elevation showing means for locking the lumber carrying arms in place;

Fig. 3 is an end elevation of the drier;

Fig. 4 is a side elevation of a gudgeon at the end of the supporting axle of the rotor of the drier;

Fig. 5 is a side elevation of a detail showing a partition wall of the compressor for compressing the air in front of the lumber;

Fig. 6 is a plan view of one of a slidable lumber-spacing device.

My improved drier comprises a pair of foundations 10 (Fig. 1) each supporting a standard 11 carrying a bearing 12 between which is disposed a squared wooden horizontal axle 15 provided at each end with a gudgeon comprising a horizontal stub shaft 16 (Fig. 4) rotatably mounted in each of said bearings and provided at its inner end with a squared box 17 receiving the end of and supporting the axle 15. A protecting plate 18 is secured on opposite faces of said axle and said box.

Pairs of L-shaped T-arms 20 are secured at intervals on said axle with their angle ends 21 (Fig. 2) engaging said plates and the inner ends of the main part of the arms placed against the side of the axle 15 so that the arms project in approximately radially opposite parallel directions. U-bolts 23 and 24 pass through said plates and axle and engage said angle-ends and arms and clamp said arms in place.

Strain rods 25 (Fig. 3) pivotally linked, as at 26, to each of said arms at the angle thereof are normally adapted to be disposed parallel to and in the direction of the adjacent arm of the same pair and have threaded outer ends. A stud bolt 28 (Fig. 5) is mounted on the outer end of each of said arms even with said threaded outer end. Spacing pieces 30 (Fig. 6) provided with inwardly pointed forked ends 31 are adapted to slidably engage the flanges 32 of said T-arms 20 and are adapted to be placed between the individual pieces 34 (Fig. 3) of lumber or other material horizontally disposed on the angle-ends 21 of said T-arms and with their edges disposed against the retreating faces of the flanges 32 of the T-arms.

Clamping yokes 35 received on the outer end of said bolts 28 and rods 25 are held in place by nuts 36 on said outer ends for causing said yokes to clamp said lumber against said angle ends 21, thereby to hold the lumber in place.

Angle plates 39 (Fig. 1) secured on the ends of said protecting plates 18 carry the lower ends of forwardly disposed side walls Patented Oct. 6, 1925.

1,555,836

UNITED STATES PATENT OFFICE.

HENRY DIERKER, OF GLENFIELD, PENNSYLVANIA.

CORNER LOCK FOR METAL BEDS.

Application filed December 19, 1924. Serial No. 756,919.

*To all whom it may concern:*

Be it known that I, HENRY DIERKER, citizen of the United States, residing at Glenfield, in the county of Allegheny and State of Pennsylvania, have invented certain new and useful Improvements in Corner Locks for Metal Beds, of which the following is a specification.

The present invention relates to metal bed-steads, and particularly to the construction of the female locking members which are secured to the bed posts and adapted to receive the male locking members secured to the ends of the side rails.

An object of the invention is to provide a locking member of this character which has a very simple construction adapted to be manufactured and assembled at small cost, and which is comparatively light and yet much stronger than the cast metal locking members heretofore in common use. It is also an object of the invention to provide a locking member adapted to be welded electrically to the post, so as to eliminate screw bolts and other auxiliary fastening devices and produce a construction where the locking member is in effect an integral part of the post.

The specific nature and advantages of the invention will be fully pointed out hereinafter.

Referring to the accompanying drawings:

Fig. 1 is a side elevation of a fragment of a metal bed-stead having my improved corner lock applied thereto.

Fig. 2 is a horizontal sectional view on the line 2—2 of Fig. 1.

Fig. 3 is a front view with the side rail removed.

In the drawings my improved female locking member is shown applied to the tubular post 10 of a metal bed. The locking member comprises a strip of metal, preferably steel, bent into the form of an elongated rectangle. Opposite marginal side portions of the rectangle are bent or pressed inwardly at 11 to provide a slot 12 which is adapted to receive the shank of the headed male member. The rectangular member thus provided may be, and preferably is, secured to the post 10 by having its top and bottom edges welded thereto, as indicated at 13. In order to reinforce the post, a strip 14 may be placed in the interior thereof opposite the locking member, the locking member and strip being welded to the post all in one weld. To form a convenient means of attachment for the cross rail, there may be provided integral with the strip forming the rectangular locking member a portion 16 projecting horizontally from the top of the rectangle, and the cross rail 15 may be welded to the underside of this projecting portion.

As illustrated, the male locking member consists of a headed bolt 17 secured to a bracket 18 to which the side rail 19 is welded.

As clearly indicated in Fig. 1, the slot 12 is shallower at the top than at the bottom, thus providing inclined surfaces 20 which are adapted to be engaged by the head of bolt 17 when the male member is inserted and lowered into the female member, the wedge action produced thereby securely clamping the bracket 18 against the open face of the rectangular female member.

It will be apparent from the foregoing description that I have provided a female locking member for metal beds of the simplest possible form and construction, consisting as it does of a single piece of steel pressed into the required form and welded to the bed post. This construction is very strong and comparatively light and can be produced at small cost. It will be observed that due to the openings above and below the slot 12 the locking member is adapted to be welded to the post with great facility, as the welding irons can be inserted into these openings.

Now having particularly described my invention, what I claim as new and desire to secure by Letters Patent of the United States is:

1. In a metal bed-stead, in combination, a post, a female locking member composed of pressed steel and consisting of an integral strip bent into a substantially elongated rectangular form and welded at its edges to the post with its major axis vertical, opposite intermediate marginal side portions of said member being pressed inwardly to provide a vertical slot and to provide inner surfaces at the sides of said slot located in a plane inclined upwardly and outwardly, and a side rail having a headed male member rigid therewith adapted to enter said female member, the shank of said male member passing through said slot and the head thereof engaging said inclined surfaces and securely wedging the side rail in position.

a clamping means on the outer end of said arms and rods.

18. In combination, a horizontal rotary axle; pairs of oppositely projecting arms secured at intervals on said axle and having angle ends engaging said axle; strain rods pivotally linked to said angle ends and adapted to be normally disposed parallel to and in the direction of an arm having threaded outer ends; a stud bolt mounted on the outer end of each of said arms even with said threaded outer end; and clamping means received on the outer end of said bolts and rods.

19. In combination, a horizontal rotary axle; pairs of L-shaped T-arms secured at intervals on said axle with the web forward and their inner end portions and angle ends engaging said axle and their arms parallel and projecting in approximately radially opposite directions; U-bolts passing through said axle and engaging said angle-ends and the arms and clamping said arms in place; strain rods pivotally linked to each of said arms at the angle thereof and normally adapted to be disposed parallel to and in the direction of the opposite arms of the same pair having threaded outer ends; a stud bolt mounted on the outer end of each of said arms even with said threaded outer end; a clamping yoke received on the outer end of said bolts and rods; and nuts on said outer ends for holding said yoke in place and causing the latter to clamp a pile of pieces of material against said angle ends and thereby to hold the pieces in place between the arm and strain rod.

20. In combination; a horizontal rotary axle; opposite approximately radial T-arms secured to said axle and having flanges at their rear part; means for securing a pile of spaced pieces of lumber against the rear face of said arms; spacing pieces provided with inwardly pointed forked ends adapted to slidably engage the flanges of said T-arms and adapted to be placed between the individual pieces of said lumber horizontally disposed with their edges disposed against the rear faces of said T-arms; and a forwardly and rearwardly open forwardly disposed box-shaped compressor box secured to said arms forward of said pile.

21. In combination, a pair of foundations; a standard on each foundation; a bearing on each standard; a squared horizontal axle between said standards; a gudgeon comprising a horizontal stub shaft rotatably mounted in each of said bearings and provided at its inner end with a squared box receiving the end of said axle and supporting the axle; opposite approximately radial arms secured to said axle; means for securing a pile of spaced pieces against the rear face of said arms; a forwardly and rearwardly open forwardly disposed box-shaped compressor secured to said arms forward of said pile; a drive pulley on one of said shafts and a braking pulley on the other; a motor for driving said drive pulley; and a brake-hand lever having an intermediate pulley- engaging shoe, and its inner end fulcrumed to the adjacent standard.

22. In a lumber drier, the combination with a horizontally rotatable axle, of radial arms secured in said axle, spacing means on said arms for retaining lumber, and a plurality of projections attached to and forward of said arms whereby to allow the air to pass between said projections and through said lumber on the arms upon rotation of said axle.

23. In a rotary drier, the combination with a horizontally rotatable axle, of a plurality of radial arms secured to said axle, spacing members attachable to said arms, said members serving to support lengths of lumber thereon and a plurality of flat members projecting perpendicularly along the length of the arms and forward of said arms, for causing compression and passage of air between said projections, as the axle is rotated.

24. In a rotary drier, the combination with a plurality of radial arms movable about a common center, an open compresser box attached to and forward of said arms, and means for rotating said arms whereby to cause compression and passage of air through the lumber supported on said arms.

JAMES A. CRAIG.